United States Patent [19]

Kantojärvi et al.

[11] 4,395,002
[45] Jul. 26, 1983

[54] EMERGENCY DRAINING MECHANISM FOR THE CENTRIFUGAL SPREADER OF AN AIRPLANE

[76] Inventors: Jouni Kantojärvi, Sompatie 13 E 9, 80230 Joensuu; Pertti Lahti, Lentoasema as 6 B, 80100 Joensuu; Veikko Lindholm, Uukuniemenkatu 3, 80200 Joensuu, all of Finland

[21] Appl. No.: 285,512

[22] Filed: Jul. 21, 1981

[30] Foreign Application Priority Data

Aug. 4, 1980 [FI] Finland ................................. 802435

[51] Int. Cl.³ .............................................. B64D 1/16
[52] U.S. Cl. ................................... 244/136; 239/171; 239/681; 222/505
[58] Field of Search ............... 244/135 R, 136, 137 R; 239/171, 650, 660, 668, 676, 681, 684; 222/505, 517, 556, 278

[56] References Cited

U.S. PATENT DOCUMENTS 1,732,406  10/1929  Junkers ............................ 244/136
1,737,123  11/1929  Page, Jr. ........................ 244/135 R
3,071,382  1/1963   De Biasi ............................ 239/660
3,777,978  12/1973  Manicatide et al. ............... 239/171

Primary Examiner—Charles E. Frankfort
Assistant Examiner—Rodney Corl
Attorney, Agent, or Firm—Mason, Fenwick & Lawrence

[57] ABSTRACT

A powdered material hopper or container is mounted in an airplane with a downwardly facing discharge opening positioned immediately above a centrifugal material discharge wheel driven by a hydraulic motor positioned in the outer end of a pivotal support in the form of a pivotal hollow housing. The pivotal hollow housing can be pivoted between a first position in which the centrifugal material discharge wheel is adjacently facing the discharge opening of the container and a second position remote therefrom for permitting a rapid emergency dumping of all material from the container. Movement of the pivotal support means is effected by a hydraulic cylinder connected to the pivotal support means and a lug extending from the lower end of the container which also provides pivotal support for the pivotal support means.

10 Claims, 3 Drawing Figures

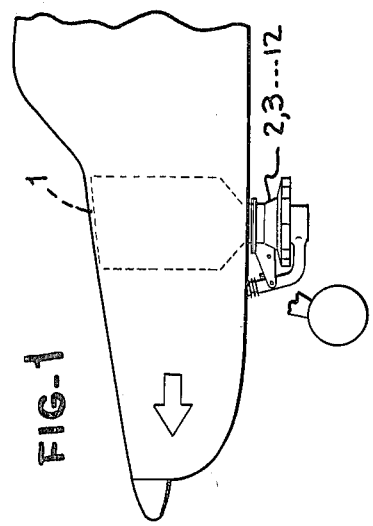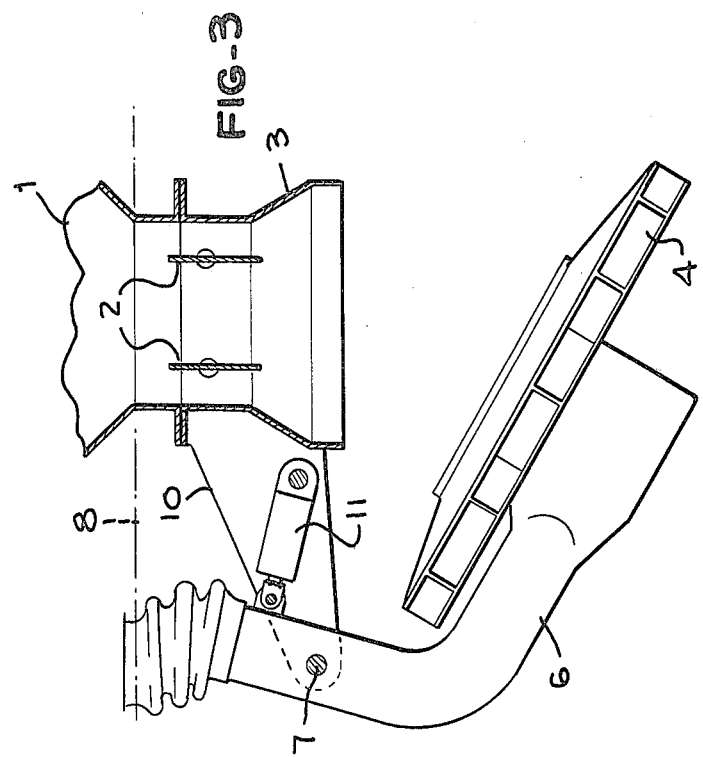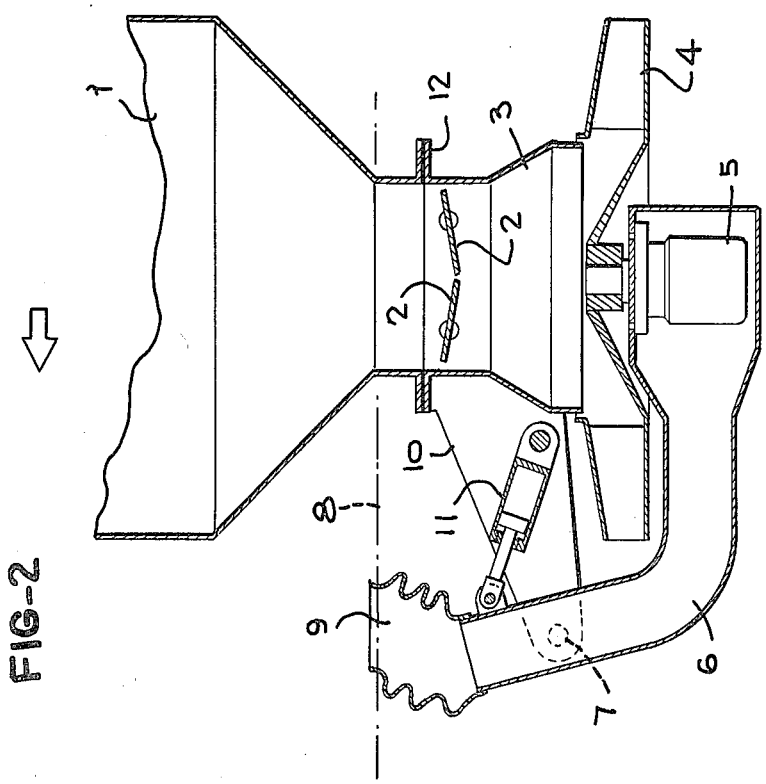

EMERGENCY DRAINING MECHANISM FOR THE CENTRIFUGAL SPREADER OF AN AIRPLANE

The present invention relates to an emergency draining mechanism of the airplanes transport container operated in connection with a centrifugal spreader of powdered or granular materials (fertilizers or the like), said spreader being provided with hydraulic transmission.

BACKGROUND OF THE INVENTION

Fertilizing flights and the like generally take off from temporary fields and use low flying altitudes. Such circumstances may lead to hazardous situations in which quick reduction of weight could prevent the accident. A centrifugal type of spreader unit is provided with a transport container and closing means at the lower end thereof as well as a centrifugal wheel with its driving device at the bottom. The material to be spread will have to pass through the blade passages of said wheel which passages, even with the closing means open, limit the draining rate. Prior known with a spreader, provided with mechanical transmission, is a pneumatic controlled emergency draining mechanism by means of which the spreader is removed from the container and dropped off the airplane, whereby the container discharges freely. On the other hand, for the spreaders operating with hydraulic transmission there has not been developed a corresponding, sufficiently simple draining mechanism and therefore the equipment used at present are not fitted with it.

The object of the invention is to improve flying safety by means of an appropriate, simple and reliable emergency draining mechanism which can be fitted to a hydraulic centrifugal spreader.

SUMMARY OF THE INVENTION

For this object, in the present invention a centrifugal wheel, together with its drive motor, is secured to a separate housing portion (making up a centrifugal unit together) journalled upstream of the spreader to a horizontal pivot. The latter is mounted on the upper structure of the spreader comprising closing and control devices for the material to be spread. The centrifugal unit is held in the operating position by a hydraulic working cylinder or a like element connected between said unit and the upper structure, by means of the pressure of a medium trapped therein. Emergency draining is triggered by discharging pressure out of the cylinder e.g. by means of a valve, the centrifugal unit being free to swing under the effect of the material and its own weight obliquely down thus opening a free draining passage past the centrifugal wheel. The operation is also possible during the take-off run as the swinging motion is limited according to ground clearance of the airplane. The container draining can be intercepted at any time by means of the closing members, whereby the amount of material wasted need not exceed that necessary to clear the hazardous situation. The centrifugal unit is brought to operating position by closing said valve and by allowing pressurized medium into the cylinder. The simplest way of doing this is to pass the medium into the cylinder from the pressure pipe of the centrifugal wheel motor through a check valve. At the same time, there is gained the advantage that possible cylinder and valve leaks are compensated for when the hydraulic motor is running, thus avoiding a positional error of the centrifugal unit.

BRIEF DESCRIPTION OF THE DRAWING

FIG. 1 shows a typical position of a centrifugal spreader on an airplane in side view, FIG. 2 is a sectional side view of a spreader with the centrifugal wheel in operating position to which the invention has been applied, and FIG. 3 is a partial section of the device of FIG. 2 in the emergency draining position.

DESCRIPTION OF THE PREFERRED EMBODIMENT

Material drains from a container or hopper 1 as controlled by closing flaps 2 through a guide chamber 3 forming the lower extent of the container and having a downwardly facing discharged opening which discharges material from the container onto a centrifugal wheel 4 which is driven by a hydraulic motor 5 and thus hurls said material over a wide range (FIG. 2). Wheel 4 and its motor 5 are mounted on a hollow, curved housing portion 6 which contains and protects motor 5 and its hydraulic hoses, not shown in the figures. Their entry in the bottom 8 of an airplane is sealed with an elastic bellows joint 9. Housing 6 is hinged by means of a horizontal pivot 7 to lugs 10 fixed on the chamber portion 3. The centrifugal unit 4, 5, 6 is held in the operating position by a cylinder 11 by means of pressurized fluid trapped behind the piston. The entire spreader assembly is secured to the container 1 by a flange joint 12. Emergency draining is effected by turning the flaps 2 into the vertical position (FIG. 3) and by draining the fluid from cylinder 11 through a shut-off valve, not shown. Thus, the centrifugal unit 4, 5, 6 descends into the position shown in FIG. 3 and material flows freely past the centrifugal wheel 4 directed backwards by air stream. Propeller blast produces suction effect in the downstream expanding gap between the centrifugal wheel 4 and chamber 3, thus further increasing the container draining rate. The centrifugal unit 4, 5, 6 is returned to the operating position by passing pressurized medium into cylinder 11 as described above.

The invention is not limited to the above-described embodiment but can be modified within the scope of the accompanying claims.

We claim:

1. An aircraft mounted system for dispensing granular or powdered material including:

a container for holding granular or powdered material, said container having a lower downwardly facing discharge opening;

pivotal support means mounted on a pivot fixedly positioned with respect to said container for pivotal movement between a first position in which an outer end of said pivotal support means is positioned immediately adjacent and beneath said discharge opening of said container and a second position spaced away from said discharge opening;

a centrifugal dispensing wheel mounted on said outer end of said pivotal support means so as to adjacently face said discharge opening to receive granular or powdered material therefrom when said pivotal support means is positioned in said first position;

motor means supported on said pivotal support means for drivingly rotating said centrifugal dispensing wheel; and power means for moving said pivotal support means to its second position so as to move said centrifugal dispensing wheel to a position remote from said discharge opening to permit a rapid emergency release discharge of substantially all granular or powdered material in said container.

2. The system of claim 1 wherein said motor means is a hydraulic motor.

3. The system of claim 2 wherein said power means is a hydraulic cylinder.

4. The system of claim 3 wherein said pivotal support means comprises a hollow curved housing.

5. The system of claim 4 wherein said motor is fully enclosed in said housing.

6. The system of claim 5 additionally including pivotal control flaps mounted inside said container for varying the rate at which material can be discharged from said container.

7. The system of claim 6 wherein said pivotal support means is mounted on an outer end of lug means connected and supported at an opposite end to a lower portion of said container.

8. The system of claim 7 wherein said hydraulic cylinder is pivotally supported on said lug means and has its rod end connected to said pivotal support means.

9. The system of claim 1 wherein said motor means is a hydraulic motor, said pivotal support means is a hollow housing and said motor is enclosed in said hollow housing.

10. The system of claim 9 wherein said pivotal support means is mounted for pivotal movement about an axis positioned forwardly of said container.

* * * * *